Patented Feb. 5, 1952

2,584,160

UNITED STATES PATENT OFFICE 2,584,160

DIALKYLAMMOALKYL ESTERS OF PHENYL HALOGENATED ORTHO - HYDROXYBENZOIC ACIDS

Melville Sahyun, St. Johns, Mich.

No Drawing. Application February 23, 1950,
Serial No. 145,895

8 Claims. (Cl. 260—474)

This invention relates to basic alkyl esters of phenyl halogenated ortho-hydroxybenzoic acids and to acid addition salts thereof.

Esters of this invention have the formula

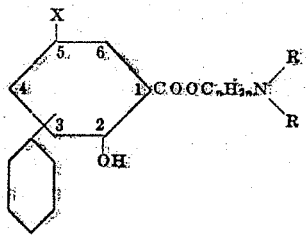

wherein R is a lower-alkyl group, the said R's being same or different, X is a member of the group consisting of chlorine, bromine, and iodine, and $n$ is an integer from the group consisting of two, three, four, and five, and wherein the phenyl group substituted on the salicylate ring is in either the three or four position.

The esters of the invention are high-boiling liquids, readily soluble in most of the common organic solvents, but insoluble in water. The acid addition salts are generally crystalline solids with well-defined melting points and are readily soluble in cold water, methanol, or ethanol, moderately soluble in isopropanol, ethyl acetate, or methyl-ethyl ketone, and insoluble in the common aliphatic, cycloaliphatic, and aromatic hydrocarbon solvents, as well as ether.

Members of this new group of compounds have been prepared and found to have value as germicides and bactericides, being very active at dilutions of one to ten thousand against Staph. aureus.

A method of preparing the esters of the present invention involves the reaction of a suitable ortho-hydroxy-benzoic acid, having the formula:

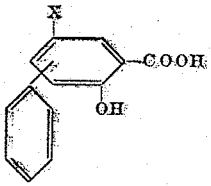

with the hydrochloride of a basic alkyl chloride having the formula:

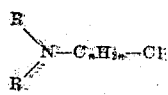

wherein R and $n$ have the values hereinbefore assigned. The reaction is usually conducted in the presence of an inert diluent such as isopropanol and occurs with relative speed at temperatures of more than forty degrees centigrade. Preferably, reflux temperatures are employed. After heating the mixture, the solvent is removed, and the residue crystallized from a suitable solvent, such as a mixture of ethanol and ether, to obtain the hydrochloride.

The free ester can be recovered and purified by dissolving the crude hydrochloride in water, extracting the solution with ether to remove any remaining inert diluent or other water-insoluble substances, alkalizing the solution with sodium hydroxide, extracting with ether or other suitable organic liquid, and the extract eventually distilled to volatilize the solvent. The basic esters can be distilled under reduced pressure to obtain a higher degree of purity if desired.

Acid addition salts of the basic esters, such as the hydrochloride, hydrobromide, sulfate, phosphate, acetate, succinate, tartrate, benzoate, citrate, lactate, picrate, and other acid addition salts can be prepared readily by allowing the free ester to react with the selected acid in a solvent such as alcohol or a mixture of alcohol and ethyl acetate. Upon distillation of the solvent, the salt remains as a residue which can be purified by recrystallization from alcohol or other suitable solvent. A mixture of ethyl alcohol and ethyl acetate is particularly suitable in most instances.

"Lower-alkyl," as used in this specification and the appended claims is intended to include aliphatic groups having from one to five carbon atoms, inclusive. Representative groups include methyl, ethyl, propyl, isopropyl, butyl, secondary-butyl, tertiary-butyl, amyl, isoamyl, et cetera. The carbon chain of the alkylene group, —$C_nH_{2n}$—, can be either straight or branched chain. Representative groups which are included are, for example, ethylene, propylene, isopropylene, butylene, amylene, isoamylene, tertiary-amylene, et cetera. Representative basic alkyl esters, which, among others, are within the scope of this invention, include beta-dipropylaminobutyl 5-iodo-4-phenyl - 2 - hydroxybenzoate, gamma-dimethylaminopropyl 5-bromo - 3 - phenyl-2-hydroxybenzoate, beta - dimethylaminoethyl 5-chloro-4-phenyl - 2 - hydroxybenzoate, beta-diisopropylamino-secondary-butyl 5 - chloro - 4 - phenyl-2-hydroxybenzoate, beta-methylethylamino ethyl 3 - phenyl - 5 - iodo-2-hydroxybenzoate, beta-butylmethylaminopropyl 4 - phenyl - 5 - bromo-2-hydroxybenzoate, gamma-dibutylaminobutyl 3-phenyl-5-chloro-2-hydroxybenzoate, et cetera.

The following examples are given to illustrate one manner which may be used to prepare the compounds of the present invention, but are not to be construed as limiting.

Example 1.—Beta - dimethylaminoisopropyl 3-phenyl-5-chloro-2-hydroxybenzoate hydrochloride A homogeneous mixture of 8.7 grams (0.035 mole) of 3-phenyl - 5 - chloro-2-hydroxybenzoic acid, 4.7 grams (0.039 mole) of beta-dimethylaminoisopropyl chloride and fifty milliliters of isopropanol was refluxed for six hours. At the end of this period, the solvent was removed by distillation under a reduced pressure of about five millimeters of mercury. The oily residue which remained, was converted into a soft solid by means of ether-trituration. This solid was recrystallized twice from a mixture of ethanol and ether to obtain 4.7 grams of beta-dimethylaminoisopropyl 3 - phenyl-5-chloro-2-hydroxybenzoate hydrochloride, a white, non-hygroscopic powder melting at 173-174 degrees centigrade.

Analysis:
Calculated: Cl 9.58  N 3.78
Found      :    9.83    3.68

Example 2.—Beta - diisopropylaminoethyl 3-phenyl-5-chloro-2-hydroxybenzoate hydrochloride Sixteen and three-tenths grams of beta-diisopropylaminoethyl chloride (0.1 mole) and 30.3 grams of 3-phenyl-5-chloro - 2 - hydroxybenzoic acid (0.1 mole) and 150 milliliters of isopropanol were refluxed for six hours. The solvent was thereafter removed by distillation at a reduced pressure of about two millimeters of mercury absolute, and resulting residue dissolved in a mixture of ethanol and ether. After two recrystallizations from a mixture of ethanol and ether, a 63 percent yield of beta-diisopropylaminoethyl 3-phenyl - 5 - chloro-2-hydroxybenzoate hydrochloride, fine, white nonhygroscopic needles, melting at 167-168 degrees centigrade, were obtained.

Analysis:
Calculated: Cl 8.60  N 3.40
Found      :    8.44    3.23

Example 3.—Beta-diethylaminoethyl 3-phenyl-5-chloro-2-hydroxybenzoate hydrochloride A homogeneous mixture of twenty grams (0.08 mole) of 3-phenyl-5-chloro - 2 - hydroxybenzoic acid, twelve grams (0.09 mole) of beta-diethylaminoethyl chloride and 100 milliliters of isopropanol was refluxed for 3.5 hours. The hot solution was then filtered and allowed to cool, whereupon the ester hydrochloride separated as a solid. It was collected on a filter, washed with ether, and dried. After recrystallization from isopropanol, there was obtained 17.3 grams of a white, non-hygroscopic solid, melting at 178-179 degrees centigrade, beta-diethylaminoethyl 3-phenyl - 5 - chloro-2-hydroxybenzoate hydrochloride.

Analysis:
Calculated: Cl 9.23  N 3.65
Found      :    9.37    3.66

Example 4.—Beta-diethylaminoethyl 3-phenyl-5-bromo-2-hydroxybenzoate hydrochloride A homogeneous mixture of 23 grams (0.08 mole) of 3-phenyl-5-bromo - 2 - hydroxybenzoic acid, 12 grams (0.09 mole) of beta-diethylaminoethyl chloride, and 100 milliliters of isopropanol was refluxed for 4.5 hours. The hot solution was then filtered and allowed to cool, whereupon the ester hydrochloride separated as a solid. It was collected on a filter, washed with ether, and dried. After recrystallization from isopropanol, there was obtained 19.7 grams of a white, non-hygroscopic solid melting at 177-178 degrees centigrade, beta-diethylaminoethyl 3-phenyl-5-bromo-2-hydroxybenzoate hydrochloride.

Analysis:
Calculated: Cl 8.27  N 3.27
Found      :    8.41    3.22

Example 5.—Beta-diethylaminoethyl 4-phenyl-5-iodo-2-hydroxybenzoate hydrochloride In a manner similar to that of Example 3, beta-diethylaminoethyl chloride and 4-phenyl-5-iodo-2-hydroxybenzoic acid were heated in isopropanol to form beta-diethylaminoethyl 4-phenyl-5-iodo-2-hydroxybenzoate hydrochloride, a white crystalline solid melting at 193-194 degrees centigrade.

Example 6.—Beta-dimethylaminoethyl 4-phenyl-5-iodo-2-hydroxybenzoate hydrochloride In a manner similar to that of Example 3, beta-dimethylaminoethyl chloride and 4-phenyl-5-iodo-2-hydroxybenzoic acid were heated in isopropanol to form beta-dimethylaminoethyl 4-phenyl -5-iodo-2-hydroxybenzoate, a white crystalline solid melting at 172-173 degrees centigrade.

Example 7

In a manner similar to that of the above examples, the following esters were prepared: beta-diethylaminoethyl 3-phenyl-5-iodo-2-hydroxybenzoate hydrochloride, melting at 176-177 degrees centigrade with decomposition; beta-diisopropylaminoethyl 4-phenyl-5-iodo- 2 -hydroxybenzoate hydrochloride, melting at 158-159 degrees centigrade with decomposition; beta-iisopropylaminoethyl-3-phenyl-5-bromo-2-hydroxybenzoate hydrochloride, melting at 162-163 degrees centigrade; and beta-diisopropylaminoethyl 3-phenyl-5-iodo-2-hydroxybenzoate hydrochloride, melting at 143-144 degrees centigrade.

Example 8.—Beta-dimethylaminoisopropyl 3-phenyl-5-chloro-2-hydroxybenzoate

Two parts of beta-dimethylaminoisopropyl 3-phenyl-5-chloro-2-hydroxybenzoate hydrochloride were dissolved in twenty parts of water. The solution was extracted twice with equal volumes of ether, and the extracts discarded. Approximately one part of flake sodium hydroxide was added thereto, and the resulting solution extracted three times with equal volumes of ether. The ether extracts were combined, dried over anhydrous magnesium sulfate, and the ether distilled therefrom. After removing the ether, free beta-dimethylaminoisopropyl 3-phenyl-5-chloro-2-hydroxybenzoate, boiling at 158-160 degrees centigrade at a pressure of 0.01 millimeter of mercury absolute, was obtained.

Various modifications may be made in the compounds of the present invention without departing from the spirit or scope thereof, and it is to be understood that I limit myself only as defined in the appended claims.

I claim:
1. A compound selected from the group consisting of (a) esters having the formula:

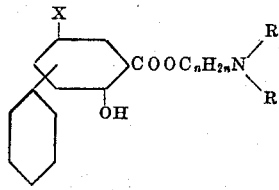

wherein R is a lower-alkyl group, $n$ is an integer from the group consisting of two, three, four, and five, X is selected from the group consisting of chlorine, bromine, and iodine, and wherein the phenyl group is attached to a position selected from the group consisting of the three and four positions of the salicylate ring, and (b) acid addition salts thereof.

2. Acid addition salts of esters having the formula:

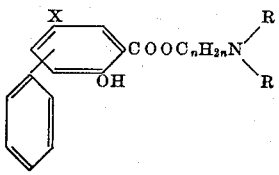

wherein R is a lower-alkyl group, $n$ is the integer 3, X is chlorine, and wherein the phenyl group is attached to the three position of the salicylate ring.

3. Acid addition salts of esters having the formula:

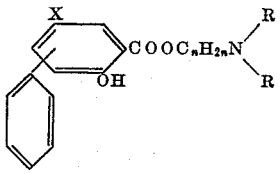

wherein R is a lower-alkyl group, $n$ is the integer 2, X is chlorine, and wherein the phenyl group is attached to the three position of the salicylate ring.

4. Beta-dimethylaminoisopropyl 3-phenyl-5-chloro-2-hydroxybenzoate hydrochloride.
5. Beta-diisopropylaminoethyl 3 - phenyl - 5 chloro-2-hydroxybenzoate hydrochloride.
6. Beta-diethylaminoethyl 3-phenyl-5-chloro-2-hydroxybenzoate hydrochloride.
7. Beta-diethylaminoethyl 3-phenyl-5-bromo-2-hydroxybenzoate hydrochloride.
8. Beta-diethylaminoethyl 4-phenyl-5-iodo-2-hydroxybenzoate hydrochloride.

MELVILLE SAHYUN.

No references cited.